(12) United States Patent
Bishop et al.

(10) Patent No.: US 12,007,360 B2
(45) Date of Patent: Jun. 11, 2024

(54) GLOBALLY-BASED AUTOMATIC LUBRICATION SYSTEM

(71) Applicant: U.E. Systems, Inc., Elmsford, NY (US)

(72) Inventors: William Bishop, Pleasantville, NY (US); Gary Mohr, Cortlandt Manor, NY (US); Blair Fraser, Cambridge (CA)

(73) Assignee: U.E. SYSTEMS, INC., Elmsford, NY (US)

( * ) Notice: Subject to any disclaimer, the term of this patent is extended or adjusted under 35 U.S.C. 154(b) by 567 days.

(21) Appl. No.: 17/131,523

(22) Filed: Dec. 22, 2020

(65) Prior Publication Data

US 2022/0196141 A1 Jun. 23, 2022

(51) Int. Cl.
*F16H 57/04* (2010.01)
*G01M 13/045* (2019.01)
(Continued)

(52) U.S. Cl.
CPC ........ *G01N 29/032* (2013.01); *G01M 13/045* (2013.01); *G01N 29/4427* (2013.01);
(Continued)

(58) Field of Classification Search
CPC ............. G01N 29/032; G01N 29/4427; G01N 29/4454; G01N 2291/2696; F01M 13/045; F16N 29/02
See application file for complete search history.

(56) References Cited

U.S. PATENT DOCUMENTS

| RE33,977 E | 6/1992 | Goodman et al. |
| 5,813,496 A * | 9/1998 | Hyvonen ................. F16N 7/40 184/7.4 |

(Continued)

FOREIGN PATENT DOCUMENTS

| EP | 2558767 B1 | 11/2020 |
| GB | 2358470 A | 7/2001 |

(Continued)

OTHER PUBLICATIONS

Extended European Search Report in corresponding European Application No. EP 22207429.6, dated Apr. 18, 2023.

(Continued)

*Primary Examiner* — Michael A Riegelman
(74) *Attorney, Agent, or Firm* — Leason Ellis LLP

(57) ABSTRACT

A bearing lubrication system includes an ultrasonic signal detector affixed in proximity or in contact with a set of bearings and a control unit. The control unit including (a) a lubrication dispenser fixed to a structure connected with the set of bearings and having an output for dispensing lubricant to the set of bearings through a controllable valve; and (b) a transceiver affixed in proximity to the set of bearings, said transceiver transmitting the ultrasonic signal to a location remote from the set of bearings. A hub computer is at the remote location that receives the ultrasonic signal from the transceiver. When the hub computer determines that the ultrasonic signal is above a local predetermined threshold the hub computer generates a local valve open/close signal and sends it back to the transceiver of the control unit. When the local valve open/close signal is received at the transceiver it causes the valve to open and allow lubricant to reach the bearings and closes the valve when the ultrasonic signal drops below the threshold.

24 Claims, 4 Drawing Sheets

(51) Int. Cl.
    *G01N 29/032*     (2006.01)
    *G01N 29/44*     (2006.01)
    *F16N 29/02*     (2006.01)

(52) U.S. Cl.
    CPC .......... *G01N 29/4454* (2013.01); *F16N 29/02* (2013.01); *G01N 2291/2696* (2013.01)

(56) References Cited

U.S. PATENT DOCUMENTS

| | | | | |
|---|---|---|---|---|
| 6,101,427 | A * | 8/2000 | Yang | F16N 29/02 700/239 |
| 6,122,966 | A * | 9/2000 | Goodman | G01N 29/36 73/660 |
| 6,189,656 | B1 * | 2/2001 | Morgenstern | F16N 17/06 184/7.4 |
| 6,339,961 | B1 * | 1/2002 | Goodman | F16N 29/02 73/644 |
| 6,447,573 | B1 * | 9/2002 | Rake | F16N 39/005 96/417 |
| 8,707,785 | B2 * | 4/2014 | Goodman | G01M 3/24 310/322 |
| 8,746,068 | B2 * | 6/2014 | Goodman | G01M 3/24 118/679 |
| 9,200,979 | B2 * | 12/2015 | Goodman | G01M 13/045 |
| 9,441,613 | B2 * | 9/2016 | Orlitzky | F03D 17/00 |
| 9,695,979 | B2 * | 7/2017 | Conley | F16C 33/6625 |
| 2003/0062380 | A1 * | 4/2003 | Boyle | B67D 7/303 222/14 |
| 2004/0197040 | A1 * | 10/2004 | Walker | F16C 41/008 384/624 |
| 2009/0228239 | A1 * | 9/2009 | Inoue | F16H 57/0405 73/53.07 |
| 2012/0132304 | A1 * | 5/2012 | Conley | F16N 7/14 137/565.17 |
| 2012/0316796 | A1 | 12/2012 | Bishop et al. | |
| 2017/0215841 | A1 | 8/2017 | Pandey | |
| 2020/0296513 | A1 | 9/2020 | Littrell | |
| 2022/0196141 | A1 * | 6/2022 | Bishop | G01N 29/032 |
| 2022/0196518 | A1 | 6/2022 | Bishop et al. | |

FOREIGN PATENT DOCUMENTS

| | | |
|---|---|---|
| JP | H02218353 H | 8/1990 |
| JP | H02218363 A | 8/1990 |

OTHER PUBLICATIONS

Bhattaru Purnendu et al: "A 36dB Gain Range, 0.5dB Gain Step Variable Gain Third-Order Filter for Portable Ultrasound Systems", 2020 33rd International Conference on VLSI Design and 2020 19th International Conference on Embedded Systems (VLSID), IEEE, Jan. 4, 2020 (Apr. 1, 2020), pp. 96-100.

International Search Report and Written Opinion in corresponding International Application No. PCT/US2021/064781, dated Mar. 29, 2022.

International Preliminary Report on Patentability in corresponding International Application No. PCT/US2021/064781, dated Jul. 6, 2023.

International Search Report and Written Opinion in corresponding International Application No. PCT/US2023/073789 mailed Feb. 21, 2024.

Examination Report in corresponding European Application No. 22207429.6, dated Apr. 8, 2024.

* cited by examiner

GLOBALLY-BASED AUTOMATIC LUBRICATION SYSTEM

FIELD OF THE INVENTION

The present invention relates generally to the lubrication of bearings of machines spread out over a large plant and, more particularly, to a system for lubrication of these bearing controlled from anywhere in the globe with an internet connection.

BACKGROUND OF THE INVENTION

Ultrasonic sensors have been used to detect ultrasonic energy generated by friction within mechanical devices, such as that created by deteriorated bearings, as disclosed in U.S. Pat. No. Re. 33,977 to Goodman, et al., the contents of which are hereby incorporated herein by reference in their entirety. The greater the amount of friction, the greater is the intensity of the generated ultrasonic energy. Applying a lubricant to the device reduces friction and consequently the intensity of the generated ultrasound drops. Measuring ultrasonic energy thus provides a way to determine when lubrication has reached the friction generating surfaces. Additionally, faulty devices, such as bearings, generate a higher level of ultrasonic energy than do good bearings and thus, this condition can also be detected.

Not only can under-lubrication quickly lead to bearing damage from increased friction, over lubrication can also be a problem. Over-lubrication can increase heat, damage bearing seals, and/or contaminate motor windings.

In the past a lubrication tool has been combined with an ultrasonic detector to help control the amount of lubrication applied to bearings. Such devices are disclosed in U.S. Pat. Nos. 6,122,966 and 6,339,961 of Goodman et al., the contents of which are incorporated herein by reference in their entirety.

In a large factory there can be numerous motors with bearing that need maintenance spread out over a few hundred areas. A typical way of handling this maintenance is for a worker to move from motor to motor with an ultrasonic detector and a grease gun. Apparatus appropriate for this is disclosed in U.S. Pat. No. 8,746,068 of Goodman, the contents of which are incorporated herein by reference in their entirety. With this unit a contact sensor is placed on the bearing housing and is connected to the ultrasonic detector. Depending on the received amplitude of the ultrasonic signal, the worker may decide that lubrication is necessary and operate a connected grease gun to dispense lubrication to the motor bearings. The lubrication is dispensed until the detected ultrasonic signal is reduced to an acceptable level. Then the worker moves to the next motor.

Because bearings differ in size and speed of rotation, the ultrasonic signal of a bearing may be unique. Also, it may change slightly over time, which may indicate wearing of the bearing. Thus, when lubrication is applied, the amplitude of the ultrasonic signal might not return to its previous low value. Despite this change in ultrasonic performance, the bearing may not be so worn as to require replacement. A known technique to handle slightly worn bearings is to provide the handheld portable ultrasonic detector/grease dispensers with memory or storage so that the amplitude of ultrasonic signals for a particular bearing can be compared over time.

The ultrasonic signal is detected and then frequency shifted (heterodyned) to the audible range so the worker can hear the signal and respond by injecting the proper amount of lubricant. In additional the handheld ultrasonic detector may store the signal or transmit it wirelessly to a remote computer for storage as disclosed in U.S. Pat. No. 9,200,979 of Goodman, the contents of which are incorporated herein by reference in their entirety. Further, the remote computer can calculate the spectrum of the ultrasonic signal either in its raw form or heterodyned form. In a design disclosed in U.S. Pat. No. 8,707,785 of Goodman, the contents of which are incorporated herein by reference in their entirety, the spectrum is generated on the handheld device itself. The handheld device may also take pictures of the bearing under test and use a series of pictures to guide the worker from bearing to bearing along a maintenance route.

As disclosed in U.S. Pat. No. 9,200,979 of Goodman a remote computer that receives signals from the hand-held device can be used to plan central maintenance operations. Once the data is on a central remote computer, if that computer is connected to the internet, the data can be accessed from anywhere in the world where there is an internet connection. See U.S. Pat. No. 10,634,650 of Goodman, the contents of which are incorporated herein by reference in their entirety. Further, this arrangement allows for cloud-based computing.

The Electric Power Research Institute (EPRI) has proposed a bearing lubrication system that detects ultrasonic acoustic emissions from a bearing and uses that data to send a trigger to an electromechanical lubricator to enable automatic condition-based lubrication. The system includes a lubricator with an acoustic detector fixed to a motor. The lubricator is preferably of the electromechanical type with a reservoir of grease that is discharged by a fixed displacement pump that forces a fixed amount of grease though an attached tube(s) into one or more bearings of the motors. Each time the lubricator is triggered it dispenses a fixed amount of grease. The amount of lubrication dispensed is related to several condition-based monitoring parameters that include acoustic output, vibration and temperature.

The acoustic detector can be an ultrasonic detector such as a low-cost piezo contact microphone or a micro-electromechanical system (MEMS) electrostatic capacitive airborne microphone. The detected signal must by transmitted from the detector for remote viewing and recording. Low-power wireless data links, however, are characterized by low bandwidth. Since acoustic data has a very high data bandwidth (e.g., 10 kHz to 40 kHz), it is impractical to transmit raw full waveforms wirelessly. It is significantly more power-efficient to send out key parameters to minimize airtime and power intensive RF transmissions. Examples of the parameters are rms, peak and crest factors for the ultrasonic baseline, starting lubrication, transition nonlubricated, fully nonlubricated and transition relubrication. As such, the device at the bearing must function primarily as an edge computing device and internally process the raw ultrasonic time domain signal data from the detector to generate parameters for wireless transmission. In particular, the time domain data is bandpass filtered and further converted to the frequency domain using FFT analysis.

In operation a local control computer which is part of the circuit at the motor notes when the detector signal has increased over a baseline value. When this happens, the dispenser is triggered, and a fixed amount of lubricant is dispensed into the bearing. Then a number of period measurements are taken. If the signal has returned to its baseline condition, it is known that the lubrication was successful. If not, the dispenser is triggered again by the local computer to apply another amount of lubricant. If the higher signal persists, a maintenance requirement notice is set.

Once data has been processed at the motor, it may be transmitted to a remote-control device for viewing and recording. EPRI proposes that this be done via Long Range Wide Area Network (LoRaWAN) technology. The transmission occurs on a periodic basis. The acoustic lubricator is designed for two-way communication such that the wireless link also provides a means to modify operational parameters such as the baseline level, measurement interval, lubrication amounts, etc. After reporting the necessary data during a measurement cycle the device will wait for acknowledgement and a configuration message from the remote control device.

This technology is well-suited for inaccessible, remote, high-temperature, and high-radiation environments that would be difficult or unsafe for personnel to access. Plant examples include, but are not limited to cooling tower fans, containment fans, control room fans, control rod drive fans, diesel generator exhaust fans and battery room exhaust fans in nuclear power plants.

While the prior art discloses various means for detecting the state of motor bearings ultrasonically, this is typically done by a worker walking to and measuring the signal at each bearing. When there is an indication that maintenance is needed, the primary fix for bearings in need of lubrication is to have the worker bring a source of lubrication with him and to deliver lubrication to that bearing until the ultrasonic signal returns to normal. This requires significant manpower and time. Also, it cannot be accomplished in dangerous environments.

The EPRI system eliminates the need for a worker to walk to test and lubricate every bearing in order to maintain it by providing a detector and an amount of lubricant at each bearing. However, control over the dispensing of lubricant is entirely automatic at the bearing. Only limited parametric data is sent to a remote location terminal where a human can view it. Also, while the remote terminal can send signals to the device at the bearing, those signals can only change its operating conditions, and cannot directly affect its lubrication. Further, the EPRI system is not capable of a continuous stream of lubricant of variable length or continuous remote monitoring of the bearing.

SUMMARY OF THE INVENTION

The present invention is a globally-based automatic lubrication system that eliminates the need for workers to walk to each bearing in a large factory to detect whether the bearing is in need of lubrication and to lubricate it. In an illustrative embodiment an ultrasonic sensor is enclosed in a local control unit mounted on and in contact with a bearing housing of a machine. A lubrication source is mounted within the local control unit and is connected to the bearing. Based on the level of ultrasound detected by the sensor above normal levels, the local control unit can cause lubricant to be automatically and continuously injected from the lubrication source into the bearing until the ultrasound level returns to normal.

The control unit of one or a plurality of bearings is wired (e.g., via Ethernet) or wirelessly (Wi-Fi and/or cell) connected to a hub with a computer that has a program and database. Because the electronics of the local control unit can be wired to the electric source for the motor, robust communications systems that require an amount of power can be used. The hub computer sends a signal to a particular local control unit, based on the hub's computer program, to indicate to the local control unit at the particular bearing that the lubrication source at the particular bearing should be operated for a period of time and then halted to lubricate that particular bearing out of a plurality of bearings connected to the hub. This can be an override signal of the lubrication control signal created in the control unit. As an alternative, with this embodiment the local control unit is not provided with the capability to operate the lubrication unit and the signal from the hub provides the only control.

Either the local control unit or the hub computer or both may be connected to a cloud-based server system. The cloud-based system keeps track of ultrasound levels at the one, or plurality of, bearings that needs to be, or has been lubricated. This information is stored at the cloud and is accessible from anywhere in the globe that has an internet connection. The system can also send signals from the cloud server to the local control unit directly or through the appropriate hub to cause it to lubricate the bearing upon command. As an alternative it can notify a local technician to manually lubricate the bearing. Thus, the cloud-based system keeps track of the levels at which various bearings need to be lubricated. It can also send signals to the local control units at the various bearings to determine when lubricant is added to the bearing. It can further calculate trends in the information.

The sensor continuously takes readings 24/7 and sends the information to the local control, the hub and/or to the cloud. In turn the local control can receive signals as to when to start and stop lubrication either from the local control, the hub or the cloud.

The system keeps track of all these actions so that interested parties can view (monitor) or be alerted to things like:
Which bearings needed lube
Which bearing received lube
How much lube, etc.

Further, an interested party can control the lubrication of an individual bearing from anywhere around the globe through the cloud-based system.

BRIEF DESCRIPTION OF THE DRAWINGS

The foregoing and other objects and advantages of the present invention will become more apparent when considered in connection with the following detailed description and appended drawings in which like designations denote like elements in the various views, and wherein.

DETAILED DESCRIPTION OF THE INVENTION

Figure 1:
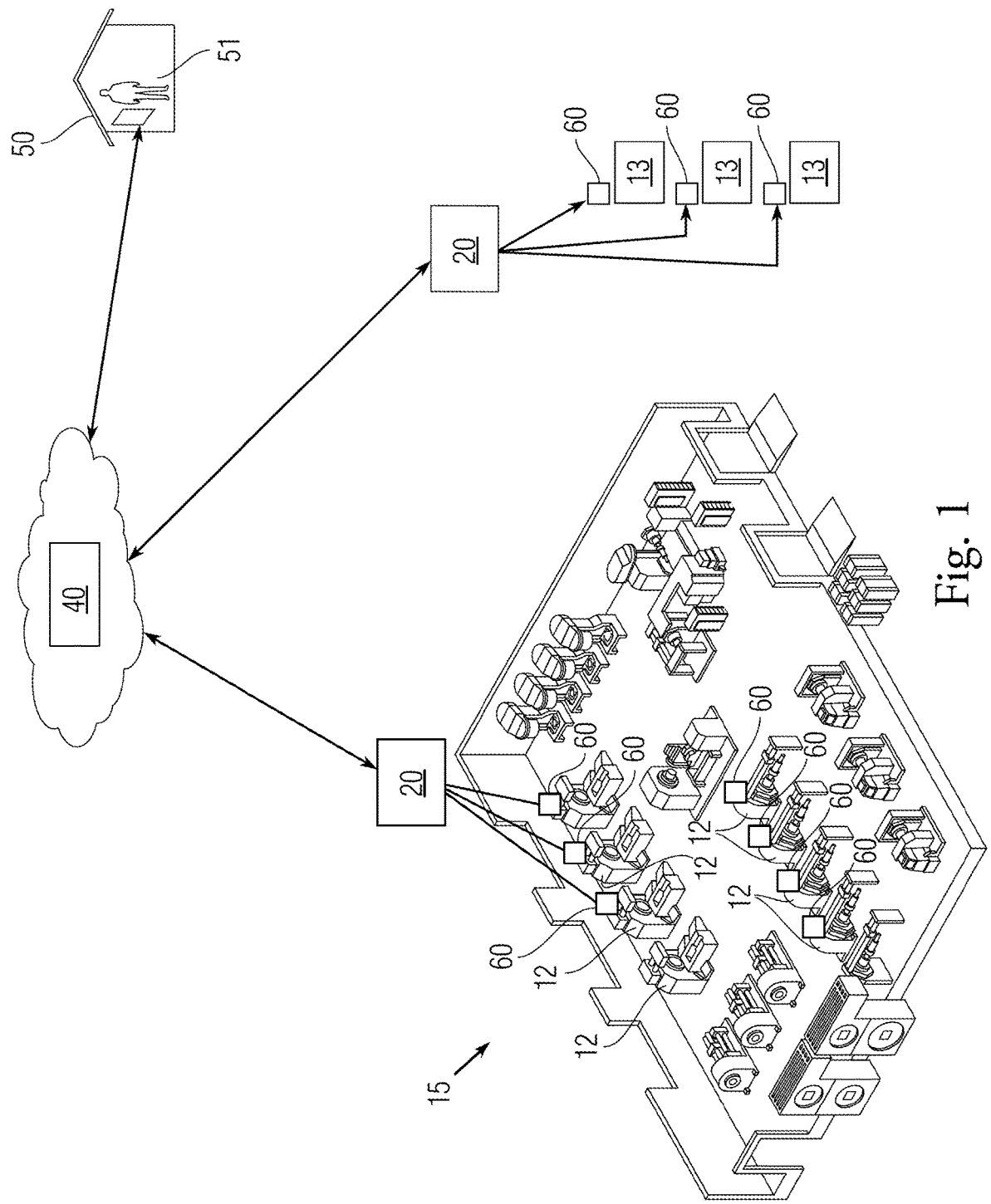
FIG. 1 is a schematic illustration of a large factory with numerous buildings housing motors with bearings that are required to be maintained with the globally-based automatic lubrication system of the present invention installed.

There are organizations responsible for maintenance at large factories spread out over acres of land. Such factories frequently contain numerous motors 12, each having at least one set of bearings. FIG. 1 shows some of the motors in a factory buildings 15, as well as some free standing motors 13.

According to the present invention, ultrasonic detectors 64 (FIG. 3) are located at the bearings of each motor 12, 13 and are enclosed in a control units 60 (FIG. 2) mounted on and in contact with a bearing housing. In a preferred embodiment these detectors are contact sensors, such as the UE System models Ultra-Trak 750 or 850 sensors. Each signal from a detector provides information about the status of the associated bearing.

A lubrication source 62 is mounted within the local control unit 60 and is connected to the bearing through a tube 64. (FIG. 2) Based on the level of ultrasound detected by the sensor above normal levels, a processor in the control unit and/or at a remote location causes lubricant to be automatically injected through the tube into the bearing until the ultrasound level returns to normal. A typical single point lubricator may contain, e.g., 250 cc of lubricant. It can be a microprocessor-controlled, energy efficient motor that drives a pump or piston to deliver grease to the bearings with precision.

The detector signal information of one or a plurality of bearings or bearing sets is also transmitted from the local control unit 60 by a wired connection, e.g., Ethernet, or wirelessly, e.g. Bluetooth, Wi-Fi or cellular, to one or more hub computers 20 with attached databases. These hub computers are at a location remote from the bearings. Because the electronics of the local control unit can be wired to the electric source for the motor, robust communications systems that require an amount of power can be used. However, as an alternative, a battery can be provided at each control unit to power the electronics.

The hub computer 20, e.g., a UE System OnTrak unit, has more computing power and storage than the local control unit. Thus, the hub computer can store historical information about each bearing connected to it and in one embodiment it can help the computer of the local control unit to set the level for activation of the grease dispenser. Further, in another embodiment the local control computer can send the full ultrasonic signal to the hub computer, the tub computer can perform more complex analysis of the signal, e.g., spectrum analysis. Because the hub computer and the local control are in two-way communication, either computer can make the decision as to whether a respective local lubricating unit should lubricate the particular bearing out of a plurality of bearings connected to the hub. The computers are programmed so that the decision of one, e.g., the hub computer, takes priority over (overrides) the other, i.e. the local control unit computer.**

Either the local control unit 60 or the hub computer 20 is connected to a cloud-based server system 40, e.g., the UE Systems Insights Dashboard and Alerting Platform. In FIG. 1 signals from the control units 60 are passed to the hub computer 20 which communicates with the cloud server 40. The cloud-based system keeps track of ultrasound levels at every one of the plurality of bearings being monitored all the time, i.e., 24/7. This information is stored at the cloud and is accessible from anywhere in the globe that has an internet connection. For example, a supervisory user 51 at a maintenance facility 50 may access the information on the cloud server. This supervisor can also cause the cloud-based sever to send signals to the local control unit 60 or hub computers 20 to cause lubrication of the bearing. As an alternative it can notify a local technician to manually lubricate the bearing or replace the bearing.

Thus, the cloud-based system keeps track of the ultrasonic levels at the various bearings and whether they need to be lubricated. The cloud-based server can also be programmed to send phone text messages or e-mails to designated personnel based on established alert conditions such as the onset of bearing failure. Also, based on commands from the supervisor, signals can be sent to the local control units 60 at the various bearings to determine when lubricant is added to the bearing.

Cloud server 40 has significant computing power and storage. As a result, it can receive and store historical and spectrum data from the hub computers 20 or it can analyze the data itself. In particular it can calculate trends in the information, e.g., historical data about the ultrasonic sound level for a particular bearing before and after lubrication. Is can also make sophisticated spectral analysis of the ultrasonic signals from any bearing.

Figure 4:
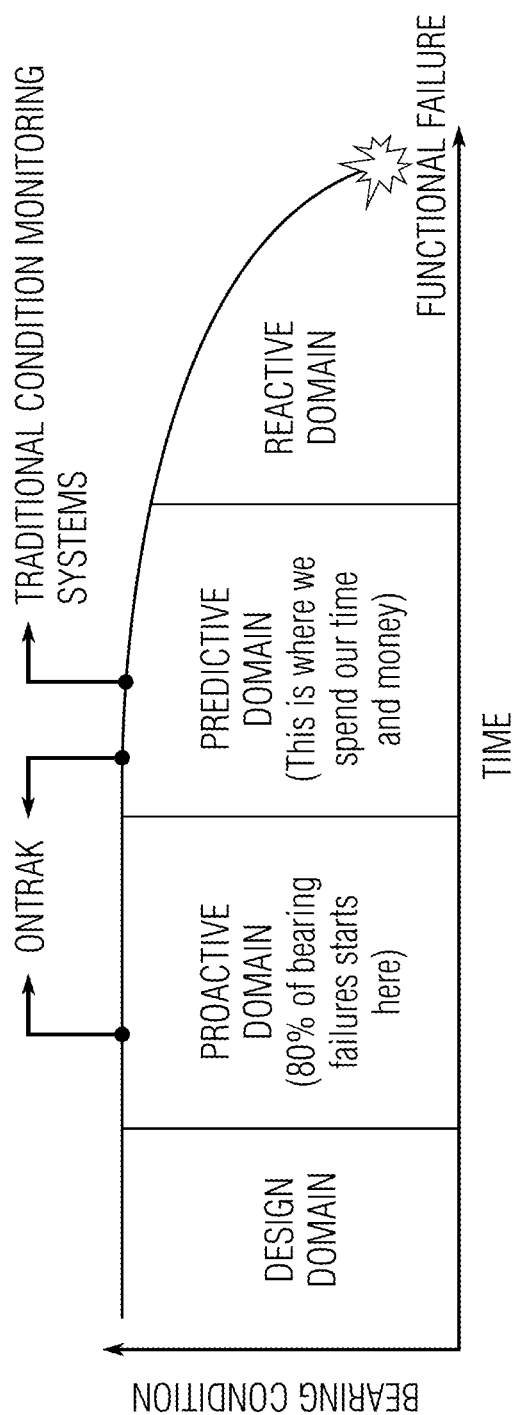
FIG. 4 is a graph of a typical bearing condition over time.

While dispensing lubrication can be based on the simple amplitude in dB of the ultrasonic signal levels, perhaps augmented by historical data, the cloud server may also implement artificial intelligence to provide more precise determinations of the amount of lubricant needed for a bearing depending on, e.g., spectral analysis of the ultrasonic signal over time from a particular bearing. FIG. 4 is a graph of a typical bearing condition over time. Using historical data, and perhaps AI, the cloud server can behave proactively. In particular, it can determine that a small amount of lubrication should be applied to the bearing, even though there has been no perceptible change in the ultrasonic level. In effect it acts proactively to prevent even the minimal amount of bearing damage necessary to cause an increase in ultrasonic signal, which is predictive of a coming functional failure.

FIG. 1 shows a single factory at one location being monitored remotely. However, with the present invention multiple factories spread out over the globe can be monitored 24/7 from any location in the globe. The likelihood that anyone bearing will need lubrication at any one time is fairly low. Thus, a single maintenance supervisor can keep track of a large number of bearings at a large number of locations. Further, with the ability of the hub computer 20 or the local control unit 60 to cause automatic lubrication, even if a supervisor were to miss the need for lubrication at anyone bearing, there is sufficient backup to prevent bearing damage.

Figure 2:
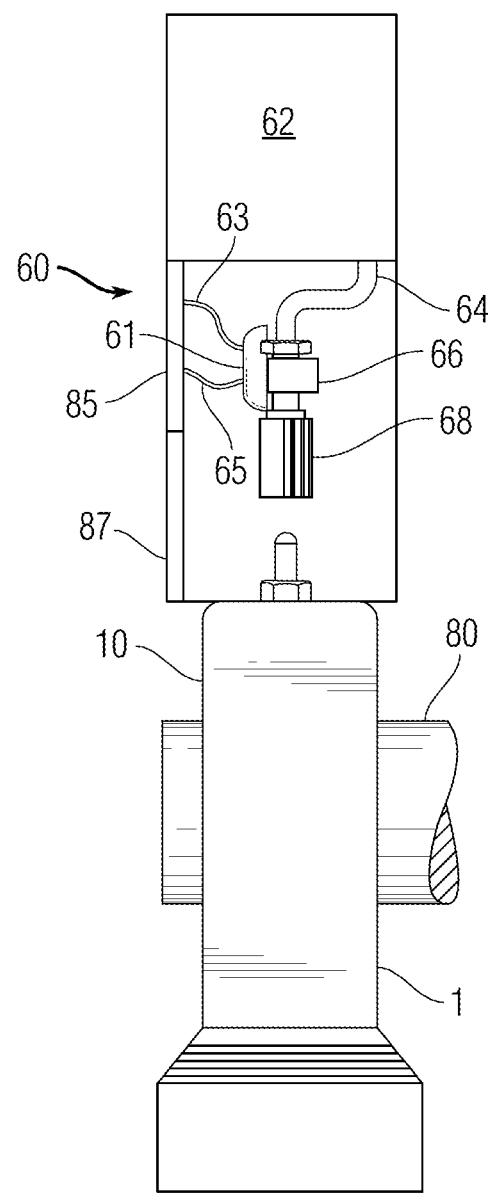
FIG. 2 is a diagram of a motor with bearings supporting a rotating shaft on which there is mounted a local control unit and automatic lubrication system according to the present invention.

As shown in FIG. 2, a bearing in a bearing housing 10 supports a shaft 80. The rotation of the shaft by a motor (not shown) creates ultrasonic signals that change over time depending on the state of lubrication of the bearings. The lubrication control unit 60 is shown mounted on the bearing housing with one side removed so its internal mechanisms can be seen. The bearing housing 10 includes a grease fitting 11 through which lubricant from a storage container 62 can pass through a line 64 to the grease fitting. In a case where the lubricant is under pressure, a control valve 66 that leads a grease fitting adapter 68 is provided in the line 64. In FIG. 2 the grease fitting adapter is shown removed from the grease fitting, but in operation it makes a firm connection. A contact sensor 61 can be attached anywhere it can receive the ultrasonic signal of the bearing. In FIG. 2, it is shown attached to the adapter 68, but it could be mounded directly on the bearing housing 10. Also, the lubrication line can be permanently attached to the bearing, eliminating the need for the adapter.

In a preferred embodiment the lubrication dispenser is equipped with an electric motor that drives a piston when active so as to push grease into line 64. The motor can provide a smooth delivery of motion of the piston or it can be a stepper motor that moves the piston in small increments. In such a case there may be no need for a valve.

However, to insure that grease does not leak into the bearing, the motor can be activated with a valve.

Figure 3:
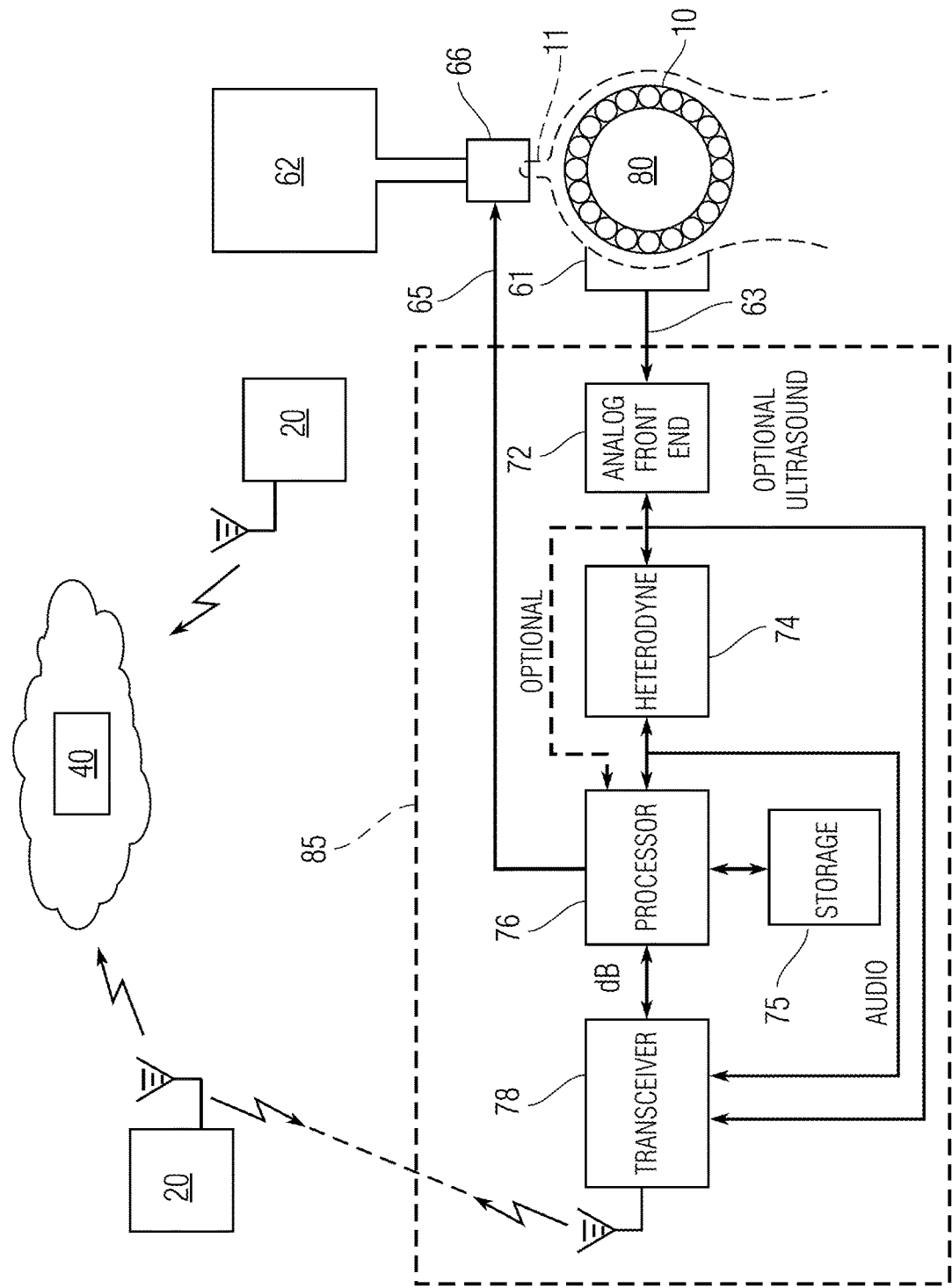
FIG. 3 is a schematic block diagram of a local control unit of the automatic lubrication system according to the present invention.

The ultrasonic signals picked up by sensor 61 are sent to a control circuit 85 over line 63 in FIG. 2, which is shown in more detail in FIG. 3. The output of the control board 85 is connected to the operating input of valve or motor/valve combination 66 over line 65. In effect, the ultrasonic signal picked up by sensor 61 is applied to control circuit 85, which, based on an analysis by a computer or processor in local circuit 85, produces an output that opens and closes valve 66 while turning the motor on and off, so the correct amount of lubricant is injected into the bearings. As an alternative or in addition, the decision can be made by hub computer 20 or cloud server 40.

Circuit 85 has a power supply driven by the electrical power provided for the motor. However, in situations where the motor power may be intermittent, a backup battery 87 is also enclosed.

After lubricant had been dispensed, the senor continues to take readings and sends information to control circuit 85, which may also send it to hub computer 20, which in turn may send it to the cloud server 40. In turn control circuit 85 may receive signals from hub computer 20 or the cloud server 40 directing it when to start and stop lubrication.

FIG. 3 includes a schematic block diagram of the control circuit 85. In FIG. 3 the bearing housing 10 is shown with the grease fitting 11. The ultrasonic contact sensor 61 is in contact with the housing 10 as opposed to the valve/motor 66 as in FIG. 2. The ultrasonic signal from sensor 61 is provided to analog front end circuit 72 of the control circuit 85 which buffers and conditions it. Circuit 72 can also have a dynamic range adjustment to set its gain based on the amplitude of the base ultrasonic signal, so the control unit does not have to be modified for the ultrasonic signal level of different bearings.

In a first most simple embodiment, the output of circuit 72, which is the full detected ultrasonic signal is applied as the input to a transceiver 78 which sends it to hub computer 20. The hub computer than sends it to cloud server 40. The transmission from the local control unit to the hub can be by hard wire (e.g., Ethernet), Bluetooth, Wi-Fi or Wi-Fi/Cellular. The transmission to the cloud server can be by hard wire (e.g., cable), Wi-Fi or Wi-Fi/Cellular. In this embodiment a determination is made at the cloud server as to whether lubrication is needed. If it is needed, the cloud server sends a lubricate control signal either directly to transceiver 78 at the local control 60 or to hub computer 20, which in turn sends it to local control 60. When the lubricate control signal is received, it may be applied directly to line 65 which operates the valve/motor 66. As an alternative. The lubricate control signal may be sent from the transceiver 78 to a processor 76, which forms the control signal for the valve/motor and applies it to line 65. In this simple embodiment the determination made by the cloud computer can be overridden by the supervisor 51, who has been monitoring the bearing outputs remotely from cloud server 40.

In a second embodiment, the output of analog front end 72, i.e., the full ultrasonic signal, is applied to processor 76, which analyzes it to determine it amplitude in decibels (dB). The dB signal is applied to the transceiver, which transmits it to the hub computer 20, which in turn transmits it to the cloud server 40. The determination of whether lubrication is needed can then be made on the basis of the dB signal either at the hub computer 20 or the cloud server 40. In either case the lubricate control signal can be returned by them to the local control unit, which activates line 65 and hence the valve/motor to lubricate the bearing.

In a third embodiment, the output of analog front end 72, i.e., the full ultrasonic signal, is applied to heterodyne circuit 74, which shifts its frequency to base band, i.e., into the audio range. This audio signal can be applied to the transceiver 78 so that it can be sent to hub computer 20 and/or cloud server 40 via Wi-Fi or Wi-Fi/Cellular. Sending the audio signal instead of the full ultrasonic signal saves bandwidth. In addition, the signal from heterodyne circuit 74 may be A/D converted and applied to processor 76. Processor 76 can calculate the amplitude of the audio signal in dB and send it to the transceiver 78, which in turn sends it to the hub computer 20 and the cloud server 40. Again, the determination as to whether the lubricate control signal is generated at the hub or the cloud.

In a fourth embodiment, processor 76 makes the determination of whether the lubricate control signal is to be generated. It can be arranged to make this determination on the basis of the full ultrasonic signal, the audio signal or the amplitude of either in dB Processor 76 has a memory or storage 75 in which programs for its operation are saved. Based on its programming, processor 76 allows or inhibits transceiver 78 from passing on the ultrasonic signal. It also determines whether the amplitude of the ultrasonic signal exceeds a threshold, indicating that the bearing needs lubrication. If it is determined that lubrication is needed, processor 76 sends the lubrication control signal to valve/motor 66 over line 65. If the lubricant in dispenser 62 is under pressure, opening the valve causes the lubricant to travel through tube 64 and valve 66 to the grease fitting 11. If grease dispenser does not have the grease under pressure, it may have a motor driven piston. In that case, the signal from processor 76 not only opens valve 66 but causes the motor (not shown) to drive the piston toward the open end of the dispenser, thus pushing out the grease.

While the lubrication is being dispensed, the sensor 61 continues to read the ultrasonic signal and the processor 76 continues to compare it to a threshold. When the ultrasonic signal drops below the threshold because of the grease it has received, the lubrication control signa is reversed by the processor 76, so that the flow of lubricant stops. As an alternative or in addition, the ultrasonic signal is passed by transceiver 78 to hub computer 20 where the valve opening and closing determination is made and then sent back to transceiver 78, which passes it to processor 76. Still further, the hub computer 20 can pass the ultrasonic signal onto the cloud server 40 to determine whether to open or close the valve, which determination is passed back to hub computer 20 and then to processor 76. Finally, a supervisor 51 or other user of the system can access the cloud server and direct that the lubrication of any bearing be started or stopped. This determination is passed back from cloud server 40 to hub computer 20 to processor 76.

In addition to an operating program, the storage 75 may have historical information about the particular bearing in order to better judge the appropriate threshold. The hub computer 20 may have stored therein more detailed historical information, and/or it may have conducted a spectrum analysis of the ultrasonic signal and is better able to determine if lubrication is needed. As indicated above, in such a case the hub computer 20 sends the information to the transceiver 78 which passes it to processor 76, which in turn may store it in storage 75. Still further, the signal from hub computer 20 may be an override signal, which causes computer 76 to generate a priority open and/or close lubrication control signal to valve/motor 66. This override signal my still further come from the cloud server 40 as a result of manual operation by a remote supervisor 51, a standard program run on the cloud server or an artificial intelligence determination.

In the first to third embodiments in which only the lubrication source and sensor are part of the control device 60, and the decision to open or close valve/motor 66 is made by hub computer 20 or cloud server 40, the processor 76 and storage 75 can be eliminated. If bandwidth is not a concern, heterodyne circuit 74 can also be eliminated and computer 20 and server 40 can operate on the raw ultrasonic signal.

While in FIGS. 2 and 3 the dispenser 62 is shown attached to a single bearing, in fact it may be attached to two or more bearings. Separate tubes 64 and valves/motors 66 would lead to each bearing set and the processor would receive the ultrasonic signal from each, perhaps by time division multiplexing. The processor would have separate outputs to the valves of each bearing set and would operate them depending on which needed lubrication.

The system keeps track of all these actions so that interested parties such as the remote supervisor can view (monitor) or be alerted to things like which bearings needed lubricant as a result of a prediction or an ultrasonic alarm, which ones received lubricant, how much lubricant they received, what happened to the ultrasonic signal when the lubricant was applied. Further, an interested party can control the lubrication of an individual bearing from anywhere around the globe through the cloud-based system.

The cloud server may be accessed by any web enabled device such as a smart phone, pc, laptop, tablet, Kindle, etc. Thus, a maintenance worker can be contacted on his phone to replace a bearing if necessary. Further, in a fifth embodiment a worker positioned at a particular bearing can access the ultrasonic signal of the bearing which is being monitored 24/7 from the cloud. As a result, the worker does not need an instrument with a detector to determine the condition of the bearing. Also, if the worker has a grease gun, he or she can manually administer lubricant to the bearing and watch the ultrasound decrease on their smart phone or other web enabled device. At the same time a maintenance supervisor can be monitoring the same bearing receiving lubricant from any convenient location in the word. Even if the worker does not have a grease gun, with this system the worker can access information about the bearing via the cloud-based server and give a manual command for the local lubricator at the bearing to dispense a shot of grease, e.g., 0.5 cc. The manual command can be repeatedly sent until the worker's smart phone indicates that the ultrasonic level had dropped back to the normal range.

Thus, one of the benefits of the system is that a user can lubricate any bearing, anytime from anywhere. Also, the single point lubricator can be enhanced so that it can indicate if there is a clog in the output line that creates excessive backpressure. If the lubricator is battery operated a low battery indicator is triggered. When the lubricator is nearly out of grease, an end of lube cycle can be indicated.

An algorithm can be used with the hub computer to sense when lubrication is required or anticipated and then when to stop lubrication. The algorithm uses information on when the end of the lubrication cycle has occurred, the number of days since the end of the lubrication cycle, the days in between, how many times the bearing has been lubricated, how much lubrication was dispensed and the date of the replacement cartridge in order to create a lubrication profile. This information is enough for the system to predict, i.e., to know ahead of time, when a particular bearing is going to need some lubrication so it can be added even before it is needed according to its ultrasonic signal as shown in FIG. 4.

By adding a little lubricant in advance of when a lot of lubricant would be required leads to longer life for the bearing.

While the present invention has been particularly shown and described with reference to preferred embodiments thereof; it will be understood by those skilled in the art that various changes in form and details may be made therein without departing from the spirit and scope of the invention, and that the embodiments are merely illustrative of the invention, which is limited only by the appended claims. In particular, the foregoing detailed description illustrates the invention by way of example and not by way of limitation. The description enables one skilled in the art to make and use the present invention, and describes several embodiments, adaptations, variations, and method of uses of the present invention.

What is claimed is:

1. A bearing lubrication system comprising:
    a control unit fixed on and in contact with a housing for a set of bearings, including:
        an ultrasonic signal detector enclosed in the control unit, fixed in proximity or in contact with the housing for the set of bearing and providing an output signal equivalent to the ultrasonic signal produced by the set of bearing;
        a lubrication dispenser enclosed in the control unit and fixed to a structure connected with the set of bearings and having an output for controllably dispensing lubricant to the set of bearings; and
        a processor enclosed in the control unit and affixed in proximity to the set of bearings, said processor continuously receives a signal related to the output of the ultrasonic signal detector and continuously compares it to a predetermined threshold, whereby when the processor determines that the received signal is above the predetermined threshold the processor generates a lubrication control signal that causes the lubrication dispenser to continuously apply lubricant to the set of bearings until the output of the ultrasonic detector drops below the threshold.

2. A bearing lubrication system comprising:
    a local control unit fixed on and in contact with a housing for a set of bearings, including:
        an ultrasonic signal detector enclosed in the local control unit, fixed in proximity or in contact with the housing for the set of bearings and providing an output signal equivalent to the ultrasonic signal produced by the set of bearings;
        a lubrication dispenser enclosed in the local control unit and fixed to a structure connected with the set of bearings and having an output for controllably dispensing lubricant to the set of bearings;
        a processor enclosed in the local control unit and affixed in proximity with the set of bearings and that receives a signal related to the output of the ultrasonic signal detector and compares it to a local predetermined threshold;
    whereby when the processor determines that the received signal is above the predetermined threshold the processor generates a lubrication control signal that causes the lubrication dispenser to dispense lubricant to reach the bearings until the received signal drops below the threshold; and
    a transceiver affixed in proximity to the set of bearings, said transceiver sending the signal related to the output of the ultrasonic detector to a remote computing device and receiving instructions from the remote computing device capable of overriding the lubrication control signal from the processor so as to directly cause the lubrication dispenser to provide lubricant to the bearings.

3. The bearing lubrication system of claim 2 wherein the signal related to the output of the ultrasonic signal detector is an equivalent ultrasonic signal.

4. The bearing lubrication system of claim 2 wherein the signal related to the output of the ultrasonic signal detector is the amplitude in dB of the ultrasonic signal.

5. The bearing lubrication system of claim 2 wherein the lubrication dispenser is a cylinder containing lubricant forced to the output by a piston connected to a motor for controllably dispensing lubricant based on the lubrication control signal.

6. The bearing lubrication system of claim 2 wherein the lubrication dispenser is a cylinder containing lubricant under pressure and a controllable valve at the output for controllably dispensing lubricant based on the lubrication control signal applied to the valve.

7. The bearing lubrication system of claim 6 wherein the lubrication dispenser further includes a motor-driven piston for applying additional pressure to controllably dispense lubricant based on the lubrication control signal applied to the motor and the valve.

8. A bearing lubrication system comprising:
a local control unit fixed on and in contact with a housing for a set of bearings, including:
an ultrasonic signal detector enclosed in the local control unit, fixed in proximity or in contact with a set of bearings and providing an output signal equivalent to the ultrasonic signal produced by the set of bearing;
a lubrication dispenser enclosed in the local control unit fixed to a structure connected with the set of bearings and having an output for dispensing lubricant to the set of bearings; and
a transceiver enclosed in the local control unit and fixed in proximity to the set of bearings, said transceiver transmitting a signal related to the output of the ultrasonic signal detector to a location remote from the set of bearings;
a hub computer at the remote location that receives the ultrasonic signal from the transceiver and, when the hub computer determines that the signal related to the output of the ultrasonic signal detector is above the local predetermined threshold, the hub computer generates a hub lubrication control signal and sends it back to the transceiver of the control unit; and
whereby when the hub lubrication control signal is received at the transceiver it solely causes the lubrication dispenser to apply lubricant to the bearings until the output of the ultrasonic signal detector drops below the local threshold.

9. The bearing lubrication system according to claim 8 wherein the transceiver connects to the hub computer by a wired connection, e.g., Ethernet, or wirelessly, e.g. Wi-Fi, Bluetooth or cellular.

10. The bearing lubrication system according to claim 8 wherein the hub computer stores historic information of the ultrasonic signals received from the control unit, and further performs spectral analysis of the ultrasonic signals.

11. The bearing lubrication system according to claim 8, wherein the control unit further includes a processor affixed in proximity with the set of bearings and that receives the output of the ultrasonic signal detector and compares it to a predetermined control threshold; whereby, when the processor determines that the ultrasonic signal is above the predetermined control threshold, the processor generates a local lubrication control signal to cause the lubrication dispenser to apply lubricant to the bearings until the output of the ultrasonic detector drops below the threshold; and
wherein the hub lubrication control signal overrides the local lubrication control signal.

12. A bearing lubrication system comprising:
an ultrasonic signal detector affixed in proximity or in contact with a set of bearings and providing an output signal equivalent to the ultrasonic signal produced by the set of bearing;
a local control unit including:
an ultrasonic signal detector affixed in proximity or in contact with a set of bearings and providing an output signal equivalent to the ultrasonic signal produced by the set of bearing;
a lubrication dispenser fixed to a structure connected with the set of bearings and having an output for dispensing lubricant to the set of bearings; and
a transceiver affixed in proximity to the set of bearings, said transceiver transmitting a signal related to the output of the ultrasonic signal detector to a location remote from the set of bearings; and
a hub computer at the remote location that receives the ultrasonic signal from the transceiver and, when the hub computer determines that the signal related to the output of the ultrasonic signal detector is above the local predetermined threshold, the hub computer generates a hub lubrication control signal and sends it back to the transceiver of the control unit;
whereby when the hub lubrication control signal is received at the transceiver it causes lubrication dispenser to apply lubricant to the bearings until the output of the ultrasonic signal detector drops below the local threshold;
a cloud-based server and storage, wherein the hub computer passes the signal related to the output of the ultrasonic signal detector to the cloud-based server, which cloud-based server compares it to a cloud-based predetermined threshold, whereby when the cloud-based server determines that the signal related to the output of the ultrasonic signal detector is above the cloud-based predetermined threshold the cloud-based server generates a cloud-based lubrication control signal to cause the lubrication dispenser to apply lubricant to the bearings until the output of the ultrasonic signal detector drops below the threshold; and
wherein the cloud-based lubrication control signal overrides the local lubrication control signal.

13. The bearing lubrication system according to claim 12 wherein the hub computer 20 connects to the cloud-based server by via Wi-Fi or Wi-Fi/Cellular.

14. The bearing lubrication system according to claim 12 further including multiple control units at respective multiple sets of bearings and wherein groups of control units are in communication with different ones of multiple hub computers, and all of the hub computers are in communication with the cloud-based server, said local control units and hub computers continuously sending signals related to the ultrasonic signals from the bearings for an extended period of time so as to provide 24/7 monitoring, and said cloud-based server storing signals related to the ultrasonic data from each set of bearings in its storage.

15. The bearing lubrication system according to claim 14 wherein the multiple sets of bearings are located throughout the globe.

16. The bearing lubrication system according to claim 14 further including an access device that is provided with access to the cloud server from any place in the globe with internet access, whereby a user of the access device can locally and remotely monitor the data for any set of bearing.

17. The bearing lubrication system according to claim 16 wherein a user of the access device can manually cause the cloud-based server to issue cloud-based lubrication control signals to any particular set of bearings.

18. The bearing lubrication system according to claim 16 wherein the access device is any one of a smart phone, pc, laptop, tablet and Kindle.

19. The bearing lubrication system according to claim 18 wherein the record further includes trends in the information, e.g., historical data about the ultrasonic sound level for a particular bearing before and after lubrication.

20. The bearing lubrication system according to claim 14 wherein the cloud-based server executes an artificial intelligence algorithm that predicts when lubrication is required or anticipated at a bearing, even before a change in the bearing's ultrasonic signal, and when to stop lubrication for a particular bearing, said algorithm relying on information on when the end of a lubrication cycle has occurred for the bearing, the number of days since the end of the lubrication cycle, the days in between, how many times the bearing has been lubricated, how much lubrication was dispensed and/or the date a replacement grease cartridge was installed.

21. The bearing lubrication system according to claim 14 wherein the cloud-based server further sends phone text messages or e-mails to designated personnel based on reset alerts.

22. The bearing lubrication system according to claim 12 wherein a record is saved in the cloud-based server storage of the amplitude in dB of ultrasonic signals from each ultrasonic detector, and the cloud-based server is adapted to run spectral analysis of the ultrasonic signals from the ultrasonic detector.

23. A bearing lubrication system comprising:
an ultrasonic signal detector affixed in proximity or in contact with a set of bearings and providing an output signal equivalent to the ultrasonic signal produced by the set of bearing;
a local control unit including:
  a lubrication dispenser fixed to a structure connected with the set of bearings and having an output for dispensing lubricant to the set of bearings; and
  a transceiver affixed in proximity to the set of bearings, said transceiver transmitting a signal related to the output of the ultrasonic signal detector to a location remote from the set of bearings;
a hub computer at the remote location that receives the ultrasonic signal from the transceiver and, when the hub computer determines that the signal related to the output of the ultrasonic signal detector is above the local predetermined threshold, the hub computer generates a hub lubrication control signal and sends it back to the transceiver of the control unit; and
a cloud-based server and storage, wherein the hub computer passes the signal related to the output of the ultrasonic signal detector to the cloud-based server, which cloud-based server compares it to a cloud-based predetermined threshold, whereby when the cloud-based server determines that the signal related to the output of the ultrasonic signal detector is above the cloud-based predetermined threshold, the cloud-based server generates a cloud-based lubrication control signal that is transmitted to the local control unit to cause the lubrication dispenser to apply lubricant to the bearings until the output of the ultrasonic signal detector drops below the threshold.

24. The bearing lubrication system according to claim 23, wherein the cloud-based lubrication control signal is transmitted to the hub computer and from the hub computer to the transceiver of the local control unit.

* * * * *